(12) United States Patent
Williams

(10) Patent No.: US 7,212,411 B2
(45) Date of Patent: May 1, 2007

(54) SCREWLESS CLIP MOUNTED COMPUTER DRIVE

(75) Inventor: Dave Williams, El Paso, TX (US)

(73) Assignee: Axxion Group Corporation, El Paso, TX (US)

( * ) Notice: Subject to any disclaimer, the term of this patent is extended or adjusted under 35 U.S.C. 154(b) by 0 days.

(21) Appl. No.: 10/764,707

(22) Filed: Jan. 26, 2004

(65) Prior Publication Data

US 2004/0221441 A1  Nov. 11, 2004

Related U.S. Application Data

(63) Continuation of application No. 09/648,405, filed on Aug. 24, 2000, now Pat. No. 6,885,550.

(60) Provisional application No. 60/150,788, filed on Aug. 26, 1999.

(30) Foreign Application Priority Data

Sep. 7, 1999 (CN) .......................... ZL99 2 44527

(51) Int. Cl.
*H05K 5/00* (2006.01)

(52) U.S. Cl. .................. 361/726; 361/685; 361/732; 174/50.54

(58) Field of Classification Search ............. 174/52.1, 174/52.4, 50.5, 50.51, 50.54; 361/685, 686, 361/725, 726, 732; 403/326, 329
See application file for complete search history.

(56) References Cited

U.S. PATENT DOCUMENTS

| | | | |
|---|---|---|---|
| 1,389,072 A | 8/1921 | Rosenberg | |
| 3,066,367 A | 12/1962 | Garman | |
| 3,996,500 A | 12/1976 | Coules | |
| 4,495,380 A | 1/1985 | Ryan et al. | |
| 4,532,564 A | 7/1985 | Larson et al. | |
| 4,601,255 A | 7/1986 | Marcotti | |
| 4,688,131 A | 8/1987 | Noda et al. | |
| 4,694,380 A | 9/1987 | Mallory et al. | |
| 4,807,557 A | 2/1989 | Lodisio | |
| 4,896,777 A | 1/1990 | Lewis | |
| 4,901,261 A | 2/1990 | Fuhs | |
| 4,914,550 A | 4/1990 | Filsinger et al. | |
| 4,960,384 A | 10/1990 | Singer et al. | |
| 4,977,532 A | 12/1990 | Barkowicz et al. | |
| 4,980,800 A | 12/1990 | Furuta | |
| 5,003,431 A | 3/1991 | Imsdahl | |
| 5,011,198 A | 4/1991 | Gruenberg et al. | |
| 5,031,070 A | 7/1991 | Hsu | |
| 5,032,952 A | 7/1991 | Cooke et al. | |
| 5,067,041 A | 11/1991 | Cooke et al. | |
| 5,098,175 A | 3/1992 | Cooke et al. | |
| 5,100,215 A | 3/1992 | Cooke et al. | |
| 5,112,119 A | 5/1992 | Cooke et al. | |
| 5,116,261 A | 5/1992 | Lan et al. | |

(Continued)

FOREIGN PATENT DOCUMENTS

JP  406215553 A  8/1994

(Continued)

*Primary Examiner*—Flemming Saether
*Assistant Examiner*—Michael P. Ferguson
(74) *Attorney, Agent, or Firm*—Karl L. Larson; Gardere Wynne Sewell, LLP

(57) ABSTRACT

A screwless clip mounted computer drive.

10 Claims, 2 Drawing Sheets

U.S. PATENT DOCUMENTS

| | | | |
|---|---|---|---|
| 5,121,296 A | 6/1992 | Hsu | |
| 5,142,447 A | 8/1992 | Cooke et al. | |
| 5,164,886 A | 11/1992 | Chang | |
| 5,175,670 A | 12/1992 | Wang | |
| 5,216,582 A | 6/1993 | Russell et al. | |
| 5,222,897 A | 6/1993 | Collins et al. | |
| D338,664 S | 8/1993 | Goff | |
| 5,253,129 A | 10/1993 | Blackborow et al. | |
| 5,262,923 A | 11/1993 | Batta et al. | |
| 5,277,615 A | 1/1994 | Hastings et al. | |
| 5,297,009 A | 3/1994 | Gelez et al. | |
| 5,299,095 A | 3/1994 | Feuerlein et al. | |
| 5,299,944 A | 4/1994 | Larabell et al. | |
| 5,302,965 A | 4/1994 | Belcher et al. | |
| 5,305,180 A | 4/1994 | Mitchell et al. | |
| 5,319,519 A | 6/1994 | Sheppard et al. | |
| 5,321,962 A | 6/1994 | Ferchau et al. | |
| 5,323,290 A | 6/1994 | Blair et al. | |
| 5,325,263 A | 6/1994 | Singer et al. | |
| 5,332,306 A | 7/1994 | Babb et al. | |
| 5,333,097 A | 7/1994 | Chritensen et al. | |
| 5,340,340 A | 8/1994 | Hastings et al. | |
| 5,379,184 A | 1/1995 | Barraza et al. | |
| 5,392,192 A | 2/1995 | Dunn et al. | |
| 5,406,300 A | 4/1995 | Tokimoto et al. | |
| 5,452,184 A | 9/1995 | Scholder et al. | |
| 5,460,441 A | 10/1995 | Hastings et al. | |
| 5,481,431 A | 1/1996 | Siahpolo et al. | |
| 5,495,389 A | 2/1996 | Dewitt et al. | |
| 5,496,181 A | 3/1996 | Addison et al. | |
| 5,502,604 A | 3/1996 | Furay | |
| 5,510,955 A | 4/1996 | Taesang | |
| 5,518,412 A | 5/1996 | Larabell | |
| 5,524,104 A | 6/1996 | Iwata et al. | |
| 5,535,093 A | 7/1996 | Noguchi et al. | |
| 5,542,757 A * | 8/1996 | Chang | 312/223.2 |
| 5,548,300 A | 8/1996 | Tokimoto | |
| 5,557,499 A | 9/1996 | Reiter et al. | |
| 5,564,585 A | 10/1996 | Saitoh | |
| 5,566,383 A | 10/1996 | Gldea et al. | |
| 5,571,256 A | 11/1996 | Giood et al. | |
| 5,584,396 A | 12/1996 | Schmitt | |
| 5,586,003 A | 12/1996 | Schmitt et al. | |
| 5,587,856 A | 12/1996 | Aoyama | |
| 5,587,881 A | 12/1996 | Wang | |
| 5,587,889 A | 12/1996 | Sacherman | |
| 5,588,728 A | 12/1996 | Eldridge et al. | |
| 5,595,501 A | 1/1997 | Ho | |
| 5,599,080 A | 2/1997 | Ho | |
| 5,602,696 A | 2/1997 | Hanson | |
| 5,612,854 A | 3/1997 | Wiscombe et al. | |
| 5,652,695 A | 7/1997 | Schmitt | |
| 5,652,697 A | 7/1997 | Le | |
| 5,670,971 A | 9/1997 | Tokimoto et al. | |
| 5,673,171 A | 9/1997 | Varghese et al. | |
| 5,673,172 A | 9/1997 | Hastings et al. | |
| 5,673,175 A | 9/1997 | Carney | |
| 5,680,293 A | 10/1997 | McAnally et al. | |
| 5,680,295 A | 10/1997 | Le et al. | |
| 5,682,291 A | 10/1997 | Jeffries et al. | |
| 5,683,159 A | 11/1997 | Johnson | |
| 5,687,059 A | 11/1997 | Hoppal | |
| 5,694,266 A | 12/1997 | Bloom et al. | |
| 5,708,563 A | 1/1998 | Cransion, III et al. | |
| 5,713,647 A | 2/1998 | Kim et al. | |
| 5,721,668 A | 2/1998 | Barrus et al. | |
| 5,721,669 A | 2/1998 | Becker et al. | |
| 5,724,227 A | 3/1998 | Hancock et al. | |
| 5,726,864 A | 3/1998 | Copeland et al. | |
| 5,726,922 A | 3/1998 | Womble et al. | |
| 5,730,515 A | 3/1998 | Ho | |
| 5,734,557 A | 3/1998 | McAnally et al. | |
| 5,737,185 A | 4/1998 | Morrison et al. | |
| 5,748,157 A | 5/1998 | Eason | |
| 5,751,547 A | 5/1998 | Honda et al. | |
| 5,777,848 A | 7/1998 | McAnally | |
| 5,779,496 A | 7/1998 | Bolinger et al. | |
| 5,781,408 A | 7/1998 | Crane, Jr. et al. | |
| 5,783,771 A | 7/1998 | Copeland et al. | |
| 5,784,251 A | 7/1998 | Miller et al. | |
| 5,785,402 A | 7/1998 | DeLorenzo | |
| 5,788,211 A | 8/1998 | Astier | |
| 5,790,372 A | 8/1998 | Dewey et al. | |
| 5,790,373 A | 8/1998 | Kim et al. | |
| 5,801,920 A | 9/1998 | Lee | |
| 5,805,420 A | 9/1998 | Burke | |
| 5,806,949 A | 9/1998 | Johnson | |
| 5,808,864 A | 9/1998 | Jung | |
| 5,808,867 A | 9/1998 | Wang | |
| 5,822,196 A | 10/1998 | Hastings et al. | |
| 5,828,547 A * | 10/1998 | Francovich et al. | 361/685 |
| 5,833,480 A | 11/1998 | Austin | |
| 5,845,978 A | 12/1998 | Jung et al. | |
| 5,850,925 A | 12/1998 | Gandre | |
| 5,852,739 A | 12/1998 | Radloff et al. | |
| 5,865,518 A | 2/1999 | Jarrett et al. | |
| 5,867,369 A | 2/1999 | Antonuccio et al. | |
| 5,870,282 A | 2/1999 | Andre et al. | |
| 5,875,068 A | 2/1999 | Sawada | |
| 5,877,938 A | 3/1999 | Hobbs et al. | |
| 5,886,869 A | 3/1999 | Fussell et al. | |
| 5,896,273 A | 4/1999 | Varghese et al. | |
| 5,914,854 A | 6/1999 | Holt | |
| 5,914,855 A | 6/1999 | Gustafson et al. | |
| 5,921,644 A | 7/1999 | Brunel et al. | |
| 5,924,780 A | 7/1999 | Ammon et al. | |
| 5,926,916 A | 7/1999 | Lee et al. | |
| 5,928,016 A | 7/1999 | Anderson et al. | |
| 5,941,617 A | 8/1999 | Crane, Jr. et al. | |
| 5,948,087 A | 9/1999 | Khan et al. | |
| 5,949,652 A | 9/1999 | McAnally | |
| D414,759 S | 10/1999 | Lu | |
| D415,139 S | 10/1999 | Fu | |
| 5,963,431 A | 10/1999 | Stancil | |
| 5,973,918 A | 10/1999 | Feleman et al. | |
| 5,973,934 A | 10/1999 | Roscoe | |
| 5,993,241 A | 11/1999 | Olson et al. | |
| 5,995,364 A | 11/1999 | McAnally et al. | |
| 6,017,106 A | 1/2000 | Adams et al. | |
| 6,018,456 A | 1/2000 | Young et al. | |
| 6,025,987 A | 2/2000 | Allirot et al. | |
| 6,037,876 A | 3/2000 | Crouch | |
| 6,040,980 A | 3/2000 | Johnson | |
| 6,069,789 A * | 5/2000 | Jung | 361/684 |
| 6,094,342 A | 7/2000 | Dague et al. | |
| 6,118,668 A | 9/2000 | Scholder et al. | |
| 6,122,173 A | 9/2000 | Feleman et al. | |
| 6,124,552 A | 9/2000 | Boe | |
| D433,022 S | 10/2000 | Lucas | |
| 6,130,817 A | 10/2000 | Flotho et al. | |
| 6,193,384 B1 | 2/2001 | Stein | |
| 6,222,459 B1 | 4/2001 | Ting | |
| D442,597 S | 5/2001 | Meyers et al. | |
| 6,227,516 B1 | 5/2001 | Webster, Jr. et al. | |
| 6,236,563 B1 | 5/2001 | Buican et al. | |
| 6,246,571 B1 | 6/2001 | Lin et al. | |
| 6,265,984 B1 | 7/2001 | Molinaroli | |
| 6,270,046 B1 | 8/2001 | Lin | |
| 6,272,009 B1 | 8/2001 | Buican | |
| 6,275,382 B1 | 8/2001 | Siedow et al. | |
| 6,278,419 B1 | 8/2001 | Malkin | |
| 6,299,266 B1 | 10/2001 | Justice et al. | |
| 6,370,022 B1 | 4/2002 | Hooper et al. | |
| 6,456,489 B1 | 9/2002 | Davis et al. | |

| | | | |
|---|---|---|---|
| 6,470,556 B2 | 10/2002 | Boe | |
| 6,485,119 B1 | 11/2002 | Davis et al. | |
| 6,486,858 B1 | 11/2002 | Altman | |
| 6,582,150 B1 | 6/2003 | Davis et al. | |
| 6,626,293 B2 | 9/2003 | St. Jeor | |
| 6,885,550 B1 * | 4/2005 | Williams | 361/685 |

2003/0210517 A1   11/2003   Syring et al.

FOREIGN PATENT DOCUMENTS

TW   0569-4811   4/2000

* cited by examiner

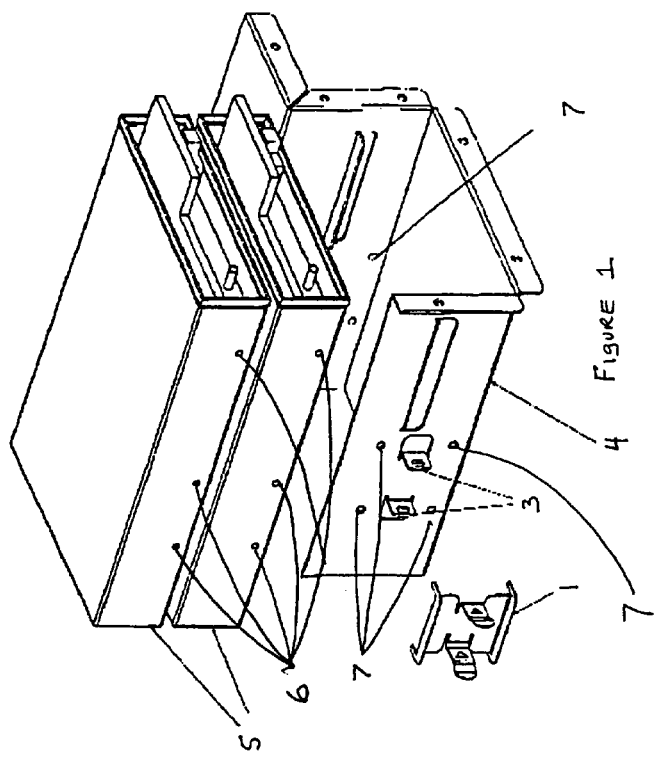
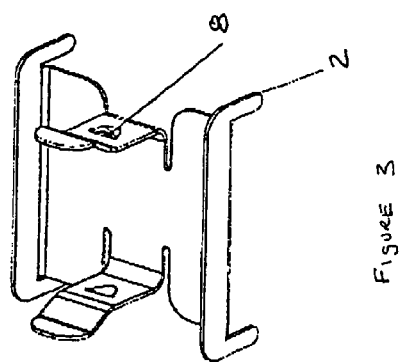
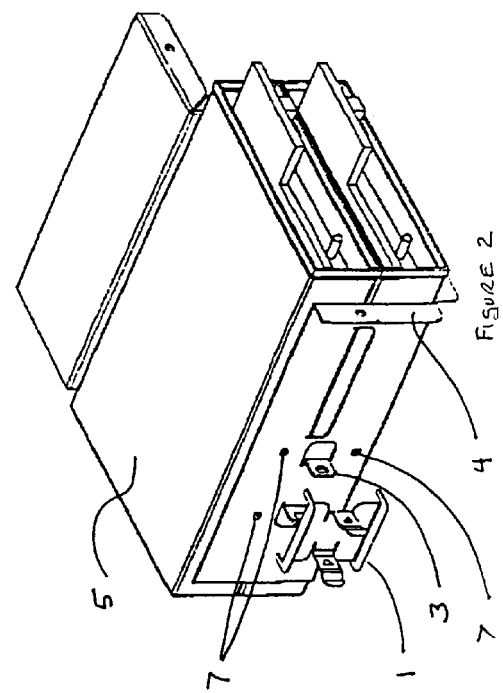

SCREWLESS CLIP MOUNTED COMPUTER DRIVE

This application is a continuation of U.S. patent application Ser. No. 09/648,405, now U.S. Pat. No. 6,885,550, filed Aug. 24, 2000, which claims benefit to U.S. Provisional Patent Application Ser. No. 60/150,788, filed Aug. 26, 1999.

BACKGROUND OF INVENTION

1. Field of Invention

This invention pertains to the design of a screw less, clip mounted computer drive. Specifically, in the present invention, a traditional drive mounting bracket or computer chassis is equipped with flexible tabs which secure a clip designed to engage and be locked into the standard screw holes located on the drive being attached.

2. Description of Prior Art

Historically, computer drives such as CD-ROMs, floppy disks, DVD drives and the like, were attached to the chassis of a computer using standard micro sized machine screws. While such method of attachment was secure and precise, it required significant amounts of labor. Further, even in the most careful of environments, damaged resulted to the other internal components of the computer due to dropped screws and tool slippage.

The perceived solution in the computer industry to the problems inherent in the screw type drive attachment means has been to incorporate separate drive rails in the chassis design which allowed the computer drive being attached to slide into and then be locked into place. Typical of this type of attachment are those inventions disclosed in U.S. Pat. Nos. 5,806,949; 5,801,920; 5,734,557; 5,599,080; 5,595,501; and 5,262,923. This solution, however, did not eliminate the use of micro sized machine screws to attach the rails to the computer drives. Additionally, use of rails necessitated the need for some type of electrical conductive grounding path between the metal drive housing and the metal computer chassis as disclosed on page 1, line 64 of U.S. Pat. No. 5,734,557. Since the rail method of attachment did not eliminate the need for micro sized machine screws and in fact created a need for additional grounding, this method has not reduced the costs and complexity of the traditional screw type assembly.

OBJECTS OF THE INVENTION

It is the object of the present invention to provide a means to attach a computer drive that is both easy as well as inexpensive. Furthermore, it is an object of the present invention to provide a computer drive attachment means that does not require the use of screws.

SUMMARY OF INVENTION

The present invention completely eliminates the needs for screws or assembly tools while installing a drive component into a computer chassis. In the present invention, a securing clip is used to fasten either one or more computer drives to a computer chassis. Although any number of securing clips can be used, the present invention utilizes at least two securing clips. The securing clips contain at least two securing pins which are small and long enough to fit through pin alignment holes in the computer chassis into the standardized screw holes present in the computer drive being installed. The securing clip of the present invention utilizes a securing clip with four (4) securing pins. The securing clips are then fastened to the computer chassis using any screw-less, conventional means of attachment such as glue, welds, Velcro® or two sided tape.

Although any screw-less, conventional means of attachment can be employed to attach the securing pins to the computer chassis, in the present invention, the securing clips are fastened to the computer chassis using clip mounting features. The securing clips are equipped with flexible tabs designed to engage clip mounting features attached to or formed from the computer chassis. The clip mounting features can be either formed directly from the computer chassis material or produced separately and attached to the computer chassis using any conventional means such as glue, welds, Velcro® or two sided tape, Once the securing clips have engaged the clip mounting features, the securing pins will be forced through the holes in the computer chassis into the standardized screw holes present in the drive being installed. Both the clip mounting features as well as the securing clip can be made from any material and of be any size so long as that when the two are engaged, the engagement is sufficient to form a secure computer drive attachment.

BRIEF DESCRIPTION OF THE DRAWINGS

FIG. 1 is an exploded isometric view of the invention depicting two typical computer drives before installation into the computer chassis.

FIG. 2 is an isometric view showing 2 typical computer drives as installed into a computer chassis using the present invention.

FIG. 3 is an isometric view of a securing clip with four securing pins.

DETAILED DESCRIPTION OF THE INVENTION

Figure 4:
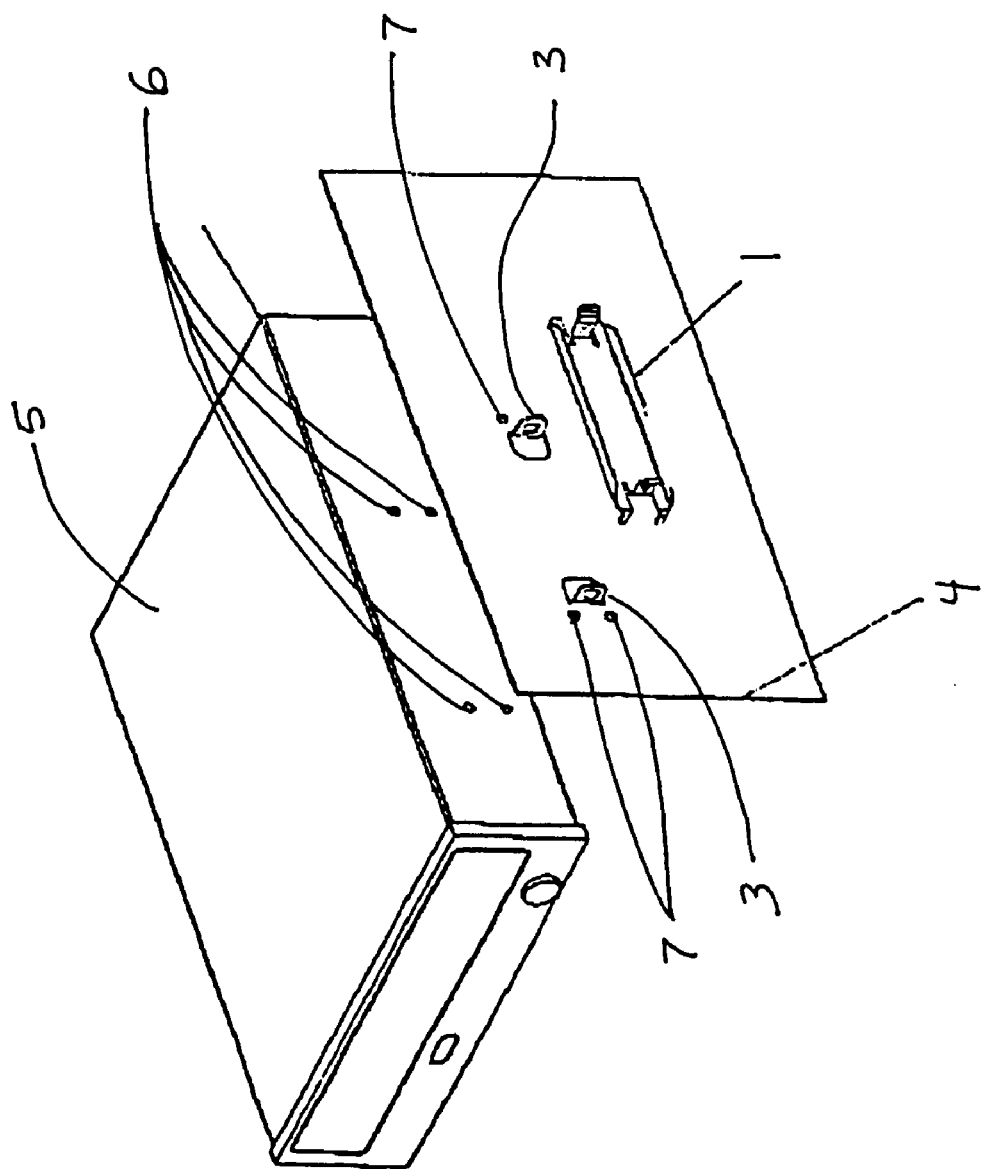
FIG. 4 is an isometric view of the installation of a single typical computer drive.

For a detailed description of the preferred embodiment of the present invention, please refer to FIGS. 1–4 in which like components are given like numbers for easy reference. FIG. 1 depicts the installation of two typical computer drives (5). Shown in FIG. 1 are the standardized screw holes (6) present on computer drives (5). The computer drives (5) are placed into the computer chassis (4) so that the standardized screw holes (6) are aligned with the pin alignment holes (7). The securing pins (2) of the securing clip (1) are positioned through the pin alignment holes (7) into the standardized screw holes (6). The securing clip (1) is attached to the computer chassis (4) using clip mounting features (3). The clip mounting features (3) engage flexible tabs (8) present on the securing clip (1).

FIG. 2 depicts the computer drives (5) after they have been installed into the computer chassis (4) but before the securing clip (1) has been attached to the clip mounting features (3). FIG. 3 shows an enlarged view of the flexible tabs (8) on the securing clip (1) along with the securing pins (2).

FIG. 4 shows the installation of one typical computer drive (5) in a computer chassis using the securing clips (1) with securing pins (2) inserted through pin alignment holes (7) into standardized screw holes (6). Also shown in FIG. 4 are the clip mounting features (3).

While the Invention has been described with reference to certain preferred characteristics, those skilled in the art will appreciate that certain changes and modifications can be made without departing from the scope and spirit of the Invention as defined by the following claims.

I claim:

1. A screwless apparatus, comprising:
   a mounting clip coupled to an outer surface of a computer chassis and having one or more flexible tabs projecting outwardly from the outer surface; and
   a securing clip detachably coupled to the mounting clip, wherein the securing clip is configured for selective engagement with the mounting clip and a computer drive, the securing clip having:
      a securing pin configured to protrude through the computer chassis and selectively engage a screw hole of the computer drive, when the computer drive is selectively attached to an interior portion of the computer chassis; and
      one or more flexible tabs configured for selective engagement with the one or more flexible tabs of the mounting clip.

2. The apparatus as recited in claim 1, further comprising an attachment means for coupling the mounting clip to the computer chassis.

3. The apparatus as recited in claim 1, wherein the one or more flexible tabs of the mounting clip comprise a pair of parallel flexible arms movable relative to each other, the one or more flexible tabs of the securing clip comprise a pair of parallel flexible arms movable relative to each other, and the flexible arms of the mounting clip define an area to resiliently receive the flexible arms of the securing clip.

4. The apparatus as recited in claim 1, further comprising an attachment means interacting between the flexible tabs of the mounting clip and the flexible tabs of the securing clip for detachably coupling the securing clip to the computer drive.

5. The apparatus as recited in claim 1, wherein the securing pin is formed from and extending as a portion of the securing clip.

6. A screwless apparatus, comprising:
   a securing clip; and
   a mounting clip coupled to an outer surface of a computer chassis, the securing clip detachably coupled to the mounting clip and having:
      at least two securing pins configured to protrude through holes on the computer chassis and into standardized screw holes on a computer drive, when the computer drive is selectively attached to an interior portion of the computer chassis; and
      a flexible tab configured for selective engagement with a corresponding flexible tab on the mounting clip of the computer chassis, the flexible tab on the mounting clip projecting outwardly from the outer surface.

7. The apparatus as recited in claim 6, further comprising an attachment means for coupling the mounting clip to the computer chassis.

8. The apparatus as recited in claim 6, wherein the mounting clip is formed from and as a portion of the computer chassis.

9. A method for selectively attaching a computer drive to an interior portion of a computer chassis, comprising:
   positioning a securing clip, the securing clip having a securing pin and one or more flexible tabs, through a pin alignment hole on the computer chassis;
   selectively engaging the securing pin in a screw hole of the computer drive, when the computer drive is selectively attached to the interior portion; and
   selectively engaging the one or more flexible tabs with one or more flexible tabs on a mounting clip, wherein the mounting clip is affixed to an outer surface of the computer chassis, and the securing clip is detachably coupled to the mounting clip, the one or more flexible tabs on the mounting clip projecting outwardly from the outer surface.

10. A screwless apparatus, comprising:
    a mounting portion on an outer surface of a computer chassis, wherein the mounting portion has one or more tabs projecting outwardly from the outer surface; and
    a securing clip detachably coupled to the mounting portion, wherein the securing clip is configured for selective engagement with the mounting portion and a computer drive, the securing clip having:
       a securing pin configured to protrude through the computer chassis and selectively engage a screw hole of the computer drive, when the computer drive is selectively attached to an interior portion of the computer chassis; and
       one or more flexible tabs configured for selective engagement with the one or more tabs of the mounting portion.

* * * * *